T. G. Stagg,
Meat Tenderer,
N° 7,735. Patented Oct. 22, 1850.
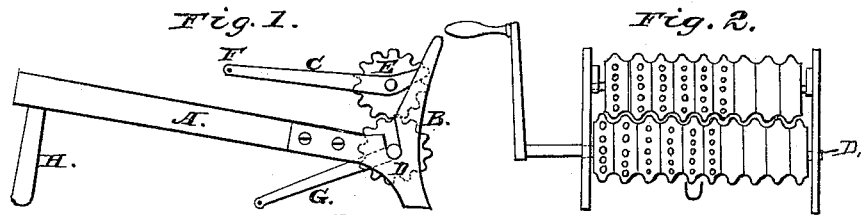
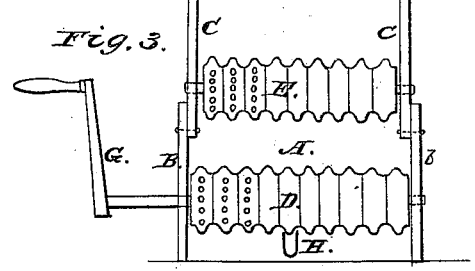
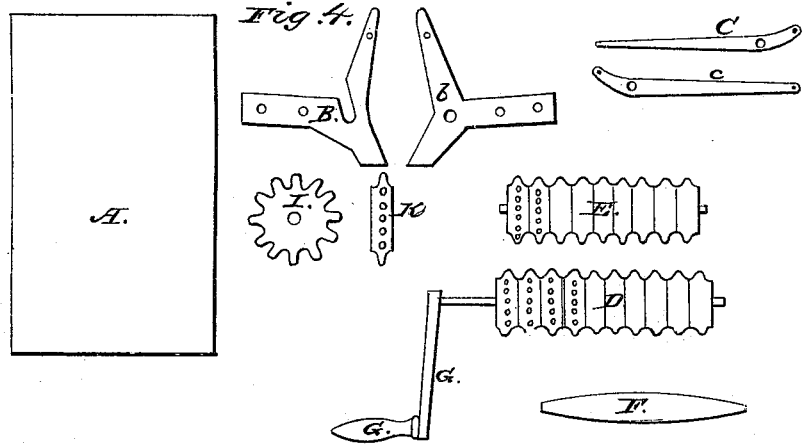

UNITED STATES PATENT OFFICE.

THOMAS G. STAGG, OF NEW YORK, N. Y.

IMPROVEMENT IN PREPARING BEEFSTEAKS FOR COOKING.

Specification forming part of Letters Patent No. 7,735, dated October 22, 1850.

*To all whom it may concern:*

Be it known that I, THOMAS G. STAGG, of the city, county, and State of New York, now temporarily residing in the city of Pittsburg, State of Pennsylvania, have invented a new and useful Machine for Making Beef and other Meat Tender before Cooking; and I do hereby declare that the following is a full, clear, and exact description of the construction and operation of the same, reference being had to the annexed drawings, making a part of this specification, in which—

Figure 1 is a side view; Fig. 2, an end view; Fig. 3, an end view with upper roller elevated, and Fig. 4 a sectional view of the same.

Similar letters indicate the parts in all the figures.

The nature of my invention consists in employing two rollers having conical or other shaped teeth, by forcing the meat between which rollers the said teeth are made to act perpendicularly and laterally on the meat, bruising the fibers thereof and bringing out the juice without mashing or flattening the meat, the upper roller to be supported on movable lever that the pressure may be regulated according to toughness of the meat, or to raise said roller to allow a bone to pass through.

Fig. 1 is a side view as the machine stands ready for use. A is the platform; B, right standard; C, right lever; D, under roller; E, upper roller; F, cross-bar; G, handle; H, leg.

In Fig. 3 A is the platform; B, right standard; *b*, left standard; C, right levers; *c*, left lever; D, under roller; E, upper roller; F, cross-bar; G, handle; H, leg.

Fig. 4 is a sectional view. A is the platform; B, right standard; *b*, left standard; C, right lever; *c*, left lever; D, under roller; E, upper roller; F, cross-bar; G, handle. The rollers are formed by nine or more toothed rings strung on a shaft, letter I being a side view of such rings, and K a front view.

What I claim as my invention, and desire to secure by Letters Patent, is—

The preparing beef and other steaks for cooking by running them through toothed rollers, substantially as set forth and described in the specification and drawings.

In witness whereof I have hereunto set my hand this 1st day of October, A. D. 1850.

THOM. G. STAGG.

Witnesses:
JOHN WALKER,
RICHD. CASSIDY.